(12) United States Patent
Ohtsubo et al.

(10) Patent No.: US 7,097,678 B2
(45) Date of Patent: Aug. 29, 2006

(54) METAL-COATED CUBIC BORON NITRIDE ABRASIVE GRAIN, PRODUCTION METHOD THEREOF, AND RESIN BONDED GRINDING WHEEL

(75) Inventors: Hirohiko Ohtsubo, Tokyo (JP); Eiji Ihara, Shiojiri (JP); Tatsuya Shimidzu, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 26 days.

(21) Appl. No.: 10/751,116

(22) Filed: Jan. 5, 2004

(65) Prior Publication Data

US 2005/0081454 A1    Apr. 21, 2005

Related U.S. Application Data

(60) Provisional application No. 60/440,385, filed on Jan. 16, 2003.

(30) Foreign Application Priority Data

Jan. 6, 2003    (JP)    ............... 2003-000448

(51) Int. Cl.
C09K 3/14    (2006.01)
B24D 3/00    (2006.01)
B24D 3/28    (2006.01)
B24D 5/00    (2006.01)

(52) U.S. Cl. ............... 51/307; 51/309; 51/293

(58) Field of Classification Search .............. 51/307, 51/309, 298, 293; 428/403
See application file for complete search history.

(56) References Cited

U.S. PATENT DOCUMENTS 4,011,064 A * 3/1977 Lee et al. ............ 51/295
5,062,865 A * 11/1991 Chen et al. ............ 51/295

FOREIGN PATENT DOCUMENTS

| EP | 0 485 660 A1 | 5/1992 |
|----|----|----|
| EP | 570635 | * 11/1993 |
| JP | 58-191779 A | 11/1983 |
| JP | 59-030671 A | 2/1984 |
| JP | 59-142066 A | 8/1984 |
| JP | 60-58273 B2 | 10/1984 |
| JP | 60-51678 A | 3/1985 |
| JP | 60-052594 A | 3/1985 |
| JP | 4-185667 A | 7/1992 |
| JP | 05-194939 A | 8/1993 |
| JP | 09-323046 A | 12/1997 |
| JP | 10-337670 A | 12/1998 |
| JP | 2000-158347 A | 6/2000 |
| JP | 2002-166370 A | 6/2002 |

* cited by examiner

*Primary Examiner*—Michael Marcheschi
(74) *Attorney, Agent, or Firm*—Sughrue Mion, PLLC

(57) ABSTRACT

A metal-coated cubic boron nitride abrasive grain obtained by forming grooves, in which the ratio (w/d) of the width (w) to the depth (d) is less than 1, and the ratio (w/L) of the width (w) to the length (L) is less than 0.1, on the surface of a cubic boron nitride abrasive grain. In this cubic boron nitride abrasive grain, the retention force (bonding strength) between the metallic coating and the cubic boron nitride abrasive grain is improved; therefore, it is possible to fabricate a resin bonded grinding wheel, in which a high grinding ratio (long life) and a low grinding power (superior grinding performance) are achieved, using such cubic boron nitride abrasive grains.

16 Claims, 5 Drawing Sheets

[Fig. 1]
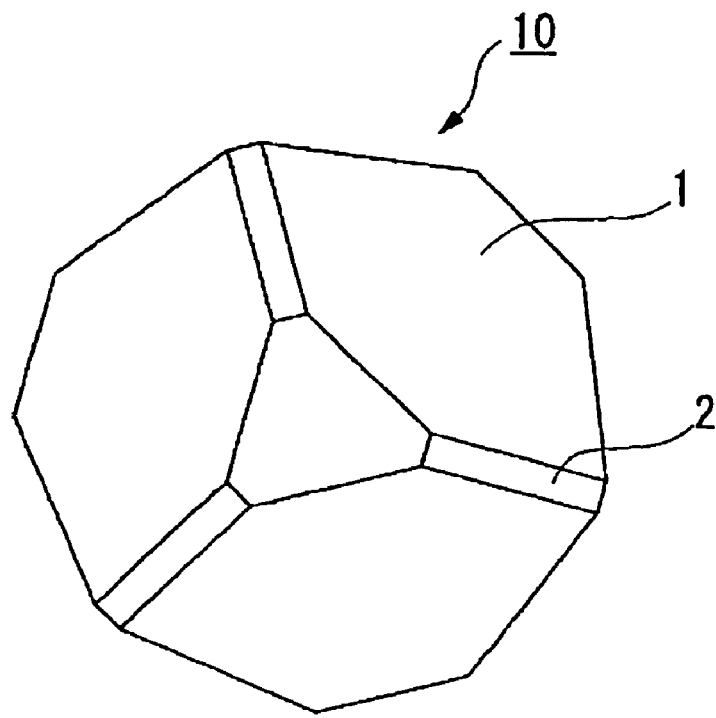
[Fig. 2]
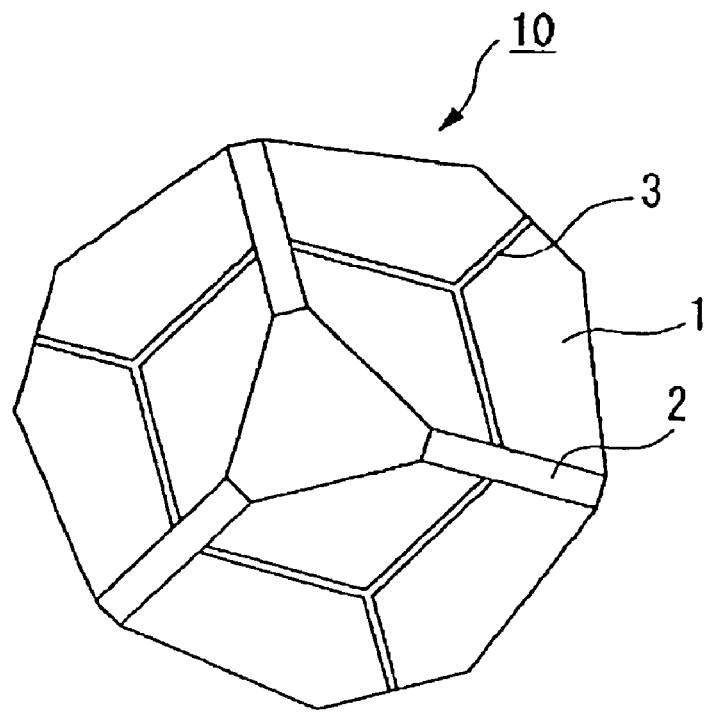

[Fig. 3]
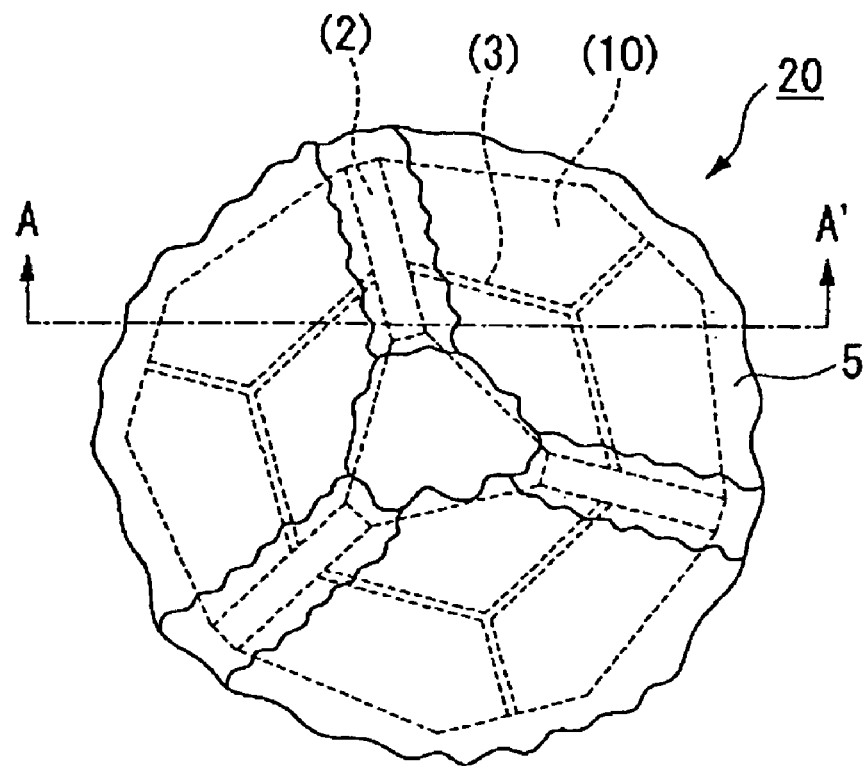
[Fig. 4]
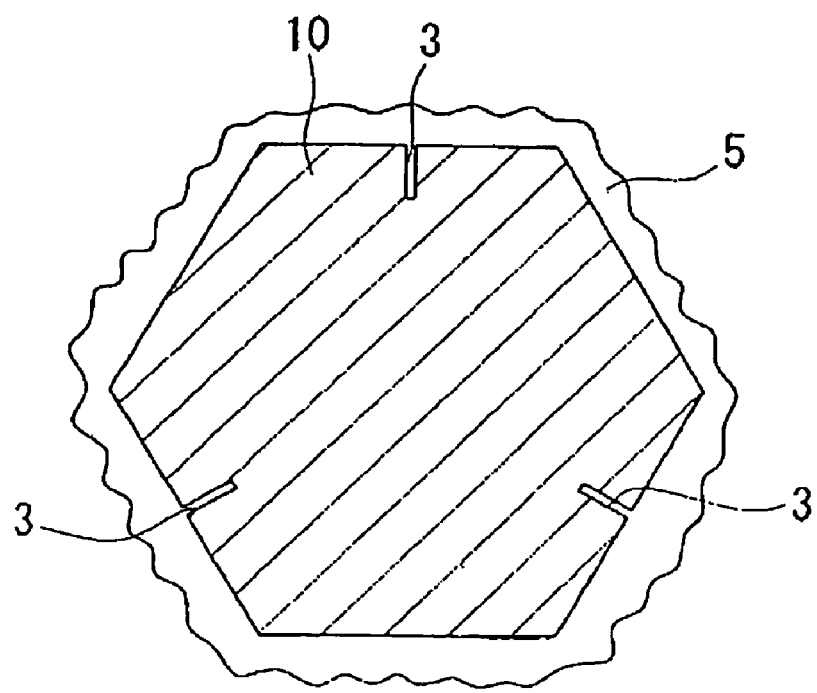

[Fig. 5]
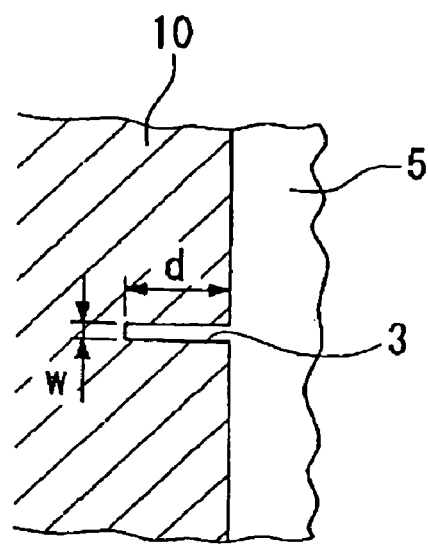
[Fig. 6]

[Fig. 7]

[Fig. 8]

METAL-COATED CUBIC BORON NITRIDE ABRASIVE GRAIN, PRODUCTION METHOD THEREOF, AND RESIN BONDED GRINDING WHEEL

Priority is claimed on Japanese Patent Application No. 2003-000448, filed Jan. 6, 2003, and U.S. Patent Provisional Application No. 60/440,385, filed Jan. 16, 2003, the contents of which are incorporated herein by reference.

BACKGROUND OF THE INVENTION

1. Field of the Invention

The present invention relates to metal-coated cubic boron nitride abrasive grains. More particularly, the present invention relates to metal-coated cubic boron nitride abrasive grains in which bonding strength between the cubic boron nitride abrasive grains and a metallic coating layer is increased, relates to a method for producing the metal-coated cubic boron nitride abrasive grains, and relates to a resin bonded grinding wheel incorporating the metal-coated cubic boron nitride abrasive grains.

2. Description of Related Art

Cubic boron nitride (which hereinafter may be simply referred to as "cBN") abrasive grains have been employed as abrasive grains of, for example, grinding wheels and coated abrasives, since cBN exhibits hardness second only to diamond, and better chemical stability against an iron workpiece when compared with diamond. The cubic boron nitride abrasive grains are produced through treatment of hexagonal boron nitride (which may be referred to as hBN) in the presence of a catalytic substance under high-temperature, high-pressure conditions (for example, about 1,400° C. to about 1,600° C., and about 4 GPa to 6 GPa), under which cubic boron nitride is thermally stable.

The thus-produced cubic boron nitride abrasive grains are employed in, for example, electroplated grinding wheels, metal bonded grinding wheels, vitrified bonded grinding wheels, and resin bonded grinding wheels.

Among these grinding wheels, the resin bonded grinding wheels, in which resin is used as a bonding agent, have a problem in that more of the cubic boron nitride abrasive grains come off during grinding operations when compared with other grinding wheels, and thereby the grinding ratio is reduced (i.e., the operative life of the grinding wheel is reduced). It is believed that the coming-off of the abrasive grains is mainly due to the following two reasons: (a) retention force between a bonding layer and a surface of a coating, such as a metallic coating, which is coated on the surface of the abrasive grains, is small; and (b) retention force between a coating, such as a metallic coating, and the surface of cubic boron nitride abrasive grains is small; therefore, various efforts have been made to find measures to increase retention force of abrasive grains so that the operative life of the grinding wheel is prolonged.

For example, metal-coated abrasive grains have been developed and are currently employed in resin bonded grinding wheels, in which a single-layered or multi-layered metallic coating, such as of nickel, nickel-phosphate, cobalt, or cobalt-phosphate, is applied to the surface of the abrasive grains so that retention force in the bonding layer is increased due to irregularities of the surface of the metallic coating (Patent Documents 1 to 4).

Patent Document 1 discloses a method for producing nickel-coated abrasive grains having high retention force due to surface irregularities, in which, during the formation of a metallic layer on the surface of the abrasive grains, spongiform nickel is used as a first layer, and dense nickel is used as a second layer.

Patent Document 2 discloses a resin bonded grinding wheel exhibiting a grinding ratio better than that of conventional ones in which a coating, which includes nickel as a first layer, cobalt as a second layer, and nickel as a third layer, is applied.

By applying a coating to the surface of the abrasive grains as explained above, retention force of the abrasive grains in the bond can be increased, the amount of the abrasive grains coming off during grinding operation can be reduced, and thus the grinding ratio of the grinding wheel has been improved.

However, even though the retention force between the metal-coated abrasive grains and the resin bond is increased, the retention force between the metallic coating and the abrasive grains become comparatively small, and the abrasive grains tend to come off while the metallic coating is left in the bonding layer, and thereby a problem is still encountered in that sufficient operative life of the grinding wheel cannot be ensured.

In view of the above circumstances, metal-coated abrasive grains exhibiting an increased retention force between a metallic coating and abrasive grains have been developed, in which a layer among two or more layers of a metallic coating is chemically bonded to the surface of the cubic boron nitride abrasive grains (Patent Documents 5 to 8).

For example, Patent Document 5 discloses metal-coated abrasive grains in which a metallic coating, such as of tungsten, molybdenum, tantalum, or niobium, is applied to the surface of diamond abrasive grains or cubic boron nitride abrasive grains so as to form a solid solution due to chemical bonding or diffusion.

Moreover, Patent Document 6 discloses metal-coated abrasive grains in which a double-layer structure is employed, and an interstitial metallic layer, serving as a first layer, is formed and chemically bonded to the surface of cubic boron nitride grains using, for example, a salt bath deposition process, a chemical vapor deposition process, or a physical vapor deposition process, and subsequently a metallic layer, serving as a second layer, is formed using, for example, an electroless deposition process, an electrolytic deposition process, or a vapor deposition process.

According to the above Patent Documents, the coming-off of the abrasive grains can be prevented by increasing the retention force due to chemical bonding between the surface of the abrasive grains and the metallic coating or due to forming of the interstitial metallic layer.

Patent Document 7 discloses abrasive grains (compound abrasive grains) in which the abrasive grains are bonded to each other using a vitrified bonding agent or a metallic bonding agent. According to the Document, because a vitrified bond or metallic bond is used for coating, the retention force between the coating and the surface of the abrasive grains is increased, the abrasive grains are strongly bonded to each other, and the retention force in the resin bond is also increased due to irregularities on the compound abrasive grains.

Patent Document 1: Japanese Unexamined Patent Application, First Publication No. S60-51678
Patent Document 2: Japanese Unexamined Patent Application, First Publication No. S59-142066
Patent Document 3: Japanese Unexamined Patent Application, First Publication No. S59-30671
Patent Document 4: Japanese Unexamined Patent Application, First Publication No. S60-52594

Patent Document 5: Japanese Unexamined Patent Application, First Publication No. H04-18567

Patent Document 6: Japanese Unexamined Patent Application, First Publication No. H05-194939

Patent Document 7: Japanese Unexamined Patent Application, First Publication No. H10-337670

Patent Document 8: Japanese Unexamined Patent Application, First Publication No. H09-323046

As described above, it is believed that the coming-off of the abrasive grains is mainly due to the following two reasons: (a) retention force between a bonding layer and a surface of coating, such as a metallic coating, which is coated on the surface of the abrasive grains, is small; and (b) retention force between a a coating, such as a metallic coating, and the surface of cubic boron nitride abrasive grains is small. Even though the retention force of the metal-coated abrasive grain in the bonding layer is increased according to the methods disclosed in, for example, Patent Documents 1 to 4, the amount of the abrasive grains coming off cannot be efficiently reduced because the retention force between the coating and the abrasive grains is small. Accordingly, Patent Documents 5 to 8 have proposed the methods for increasing the retention force between the coating and the surface of the abrasive grains. According to these methods, the retention force between the coating and the surface of the abrasive grains is increased, the retention force of the grinding agents in the resin bond is increased, and thus the grinding ratio is improved. However, according to these methods, bonding between the coating and the surface of the abrasive grains is so strong that the coming-off of the abrasive grains in which cutting edges have been worn out is also restrained; therefore, a problem is encountered in that grinding power during grinding operations is increased.

In the case of the resin bonded grinding wheels, when the grinding power becomes high, deterioration of the resin bond and burning of a workpiece tend to easily occur due to grinding heat. It is necessary for the abrasive grains to appropriately come off for obtaining sharp cutting edges in order to maintain superior grinding performance without increasing the grinding power.

While it is strongly demanded that the retention force of the grinding agents be increased (i.e., the grinding ratio be increased) in view of the operative life of tools and overall machining cost, it is also necessary for the abrasive grains to appropriately come off for obtaining sharp cutting edges in order to maintain superior grinding performance without increasing the grinding power.

The methods disclosed in Patent Documents 5 to 8 contain problems in that the production cost is increased due to complicated means and steps for forming the coating, and it is difficult to control the mass ratio of the coating so to be constant.

In view of the above-described problems, new abrasive grains for resin bonded grinding wheels have been strongly demanded by which an increase in the grinding ratio and restraint of increasing grinding power can be simultaneously achieved.

SUMMARY OF THE INVENTION

In view of the above-described problems, the present inventors have conducted intensive research. As a result, the present inventors discovered a method and thus arrived at the present invention, in which metal is intruded into each of the abrasive grains, and thereby the retention force between a metallic coating and the abrasive grains can be increased.

According to the method of the present invention, metal-coated cubic boron nitride abrasive grains that exhibit an improved grinding ratio due to increased retention force between a metallic coating and abrasive grains can be produced. Moreover, according to the method of the present invention, grinding wheels that can maintain superior grinding performance when compared with resin bonded grinding wheels in which abrasive grains whose retention force is increased using conventional methods are employed. Furthermore, according to the method of the present invention, because the processes for producing abrasive grains are simplified when compared with conventional methods, the cost for producing abrasive grains can be reduced. As a result of these facts, the cost for grinding operations can be reduced when compared with the cases in which conventional cubic boron nitride abrasive grains are used.

More specifically, the present invention relates to the following:

(1) A metal-coated cubic boron nitride abrasive grain including a cubic boron nitride abrasive grain, and a metal intruding into the cubic boron nitride abrasive grain;

(2) A metal-coated cubic boron nitride abrasive grain according to (1), wherein the cubic boron nitride abrasive grain has a groove formed on the surface thereof, and the cubic boron nitride abrasive grain is coated with a metallic layer;

(3) A metal-coated cubic boron nitride abrasive grain according to (2), wherein the groove formed on the surface of the cubic boron nitride abrasive grain has a portion in which the ratio (w/d) of the width (w) of the portion to the depth (d) thereof is less than 1;

(4) A metal-coated cubic boron nitride abrasive grain according to (2) or (3), wherein the width (w) of the groove formed on the surface of the cubic boron nitride abrasive grain is in a range of 0.3 to 3 μm, and the depth (d) thereof is in a range of 0.3 to 250 μm;

(5) A metal-coated cubic boron nitride abrasive grain according to any one of (2) to (4), wherein the groove formed on the surface of the cubic boron nitride abrasive grain has a portion in which the ratio (w/L) of the width (w) of the portion to the length (L) thereof is 0.1 or less;

(6) A metal-coated cubic boron nitride abrasive grain according to any one of (2) to (5), wherein the groove, which is formed on the surface of the cubic boron nitride abrasive grain and has a portion in which the ratio (w/d) is less than 1, has a length (L) of 20 μm or greater;

(7) Metal-coated cubic boron nitride abrasive grains according to any one of (2) to (6), wherein an average diameter of the cubic boron nitride abrasive grains is in a range of 40 to 1000 μm;

(8) A metal-coated cubic boron nitride abrasive grain according to any one of (2) to (7), wherein the metallic coating includes at least one layer selected from a group consisting of an electroplated nickel coating, an electroplated cobalt coating, an electroless-plated nickel coating, and an electroless-plated cobalt coating;

(9) A metal-coated cubic boron nitride abrasive grain according to any one of (2) to (8), wherein the metallic coating includes at least one layer of an electroplated nickel coating or an electroless-plated nickel coating;

(10) A metal-coated cubic boron nitride abrasive grain according to any one of (2) to (9), wherein an outermost layer of the metallic coating is an electroplated nickel coating or an electroless-plated nickel coating;

(11) A metal-coated cubic boron nitride abrasive grain according to any one of (2) to (10), wherein the metallic coating is an electroplated nickel coating or an electroless-plated nickel coating;

(12) A metal-coated cubic boron nitride abrasive grain according to any one of (2) to (10), wherein the metallic coating has a double-layer structure including a first layer of an electroless-plated nickel coating or an electroless-plated cobalt coating, a second layer of an electro-plated nickel coating or an electroless-plated nickel coating which has a composition which is different from that of the first layer;

(13) A metal-coated cubic boron nitride abrasive grain according to any one of (2) to (10), wherein the metallic coating has a triple-layer structure including a first layer of an electroless-plated nickel coating or an electroless-plated cobalt coating, a second layer of an electroplated nickel coating, an electroless-plated nickel coating, an electroplated cobalt coating, or an electroless-plated cobalt coating which has a composition which is different from that of the first layer, and a third layer of an electro-plated nickel coating or an electroless-plated nickel coating which has a composition which is different from that of the second layer;

(14) A metal-coated cubic boron nitride abrasive grain according to any one of (2) to (13), wherein the amount of the metallic coating is from 20 to 80 wt % based on the entire metal-coated cubic boron nitride abrasive grain including the metallic coating;

(15) Abrasive grains including the metal-coated cubic boron nitride abrasive grain according to any one of (1) to (14) in an amount of 5 to 100 wt. %;

(16) A method for producing metal-coated cubic boron nitride abrasive grains, including the steps of thermally treating cubic boron nitride abrasive grains at a highest treatment temperature of 900° C. or higher, to thereby form grooves on the surfaces of the cubic boron nitride abrasive grains; and coating the cubic boron nitride abrasive grains with metallic layers;

(17) A method for producing metal-coated cubic boron nitride abrasive grains according to (16), wherein, in the step of thermal treatment, the cubic boron nitride abrasive grain is heated in an oxidizing atmosphere in which the highest treatment temperature is set in a range of 900° C. to 1300° C.;

(18) A method for producing metal-coated cubic boron nitride abrasive grains according to (16), wherein, in the step of thermal treatment, the cubic boron nitride abrasive grain is heated in a non-oxidizing atmosphere in which the highest treatment temperature is set in a range of 900° C. to 1600° C.;

(19) A method for producing metal-coated cubic boron nitride abrasive grains according to any one of (16) to (18), wherein, in the step of thermal treatment, the cubic boron nitride abrasive grain is heated at a temperature increasing rate of 6° C./min or greater at least in a range of 800° C. to the highest treatment temperature;

(20) A method for producing metal-coated cubic boron nitride abrasive grains according to any one of (16) to (19), wherein, in the step of thermal treatment, the cubic boron nitride abrasive grain is heated at a temperature increasing rate of 6° C./min or greater in a range of 800° C. to the highest treatment temperature, and then the treatment temperature is decreased to 800° C. at a rate of 6° C./min or greater;

(21) A method for producing metal-coated cubic boron nitride abrasive grains according to any one of (16) to (20), wherein, in the step of thermal treatment, a retention time during which the cubic boron nitride abrasive grain is retained at the highest treatment temperature is set to be 60 minutes or less;

(22) A metal-coated cubic boron nitride abrasive grain produced using the method according to any one of (16) to (21);

(23) A resin bonded grinding wheel including a metal-coated cubic boron nitride abrasive grain according to any one of (1) to (14) and (22);

(24) A resin bonded grinding wheel including an abrasive grain according to (15).

BRIEF DESCRIPTION OF THE DRAWINGS

FIG. 1 schematically shows the appearance of a cubic boron nitride abrasive grain which has not been subjected to a treatment.

FIG. 2 schematically shows the appearance of a cubic boron nitride abrasive grain which has been subjected to a heat treatment.

FIG. 3 is a schematic perspective view showing a cubic boron nitride abrasive grain on which a groove has been formed and then a metallic coating layer is coated.

FIG. 4 is a schematic cross-sectional view of the cubic boron nitride abrasive grain shown in FIG. 3, as taken along line A–A'.

FIG. 5 is a schematic diagram of the cross-section shown in FIG. 4, showing a region of the abrasive grain into which the metallic coating layer intrudes.

FIG. 6 is an SEM (Scanning Electron Microscope) image showing a cubic boron nitride abrasive grain which has been subjected to a heat treatment.

FIG. 7 is an SEM image showing a region of the cubic boron nitride abrasive grain, which has been subjected to a heat treatment, into which a metallic coating layer intrudes.

FIG. 8 is an SEM image showing the surface of a cubic boron nitride abrasive grain which has been subjected to etching by use of a chemical.

DETAILED DESCRIPTION OF THE INVENTION

A metal-coated cubic boron nitride abrasive grain of the present invention, in which metal intrudes into an abrasive grain, is obtained by, for example, forming a space that extends from the surface of a cubic boron nitride abrasive grain to an interior thereof, and by coating the cubic boron nitride abrasive grain having the space with a metallic coating layer. It is preferable that the space on the surface of the cubic boron nitride abrasive grain have a groove-like shape. The groove may have a shape like a crack.

As a means for forming a groove on the surface of a cubic boron nitride abrasive grain, for example, a method using a heat treatment may be employed.

The groove can be formed on the surface of the cubic boron nitride abrasive grain by applying a heat treatment to the cubic boron nitride abrasive grain in a normal atmosphere, in a vacuum, or in a nitrogen atmosphere. The status of the groove formed varies depending on the type of cubic boron nitride abrasive grain, and a sufficient groove can be formed on the surface of the cubic boron nitride abrasive grain without significantly decreasing the strength of the abrasive grain by adjusting a highest treatment temperature during a heat treatment, a type of atmosphere, a retention time at the highest treatment temperature, a temperature increasing rate, a temperature decreasing rate, and the like.

When a groove is formed on the surface of the abrasive grain using a heat treatment, it is preferable that a temperature increasing rate and a temperature decreasing rate be set to be 6° C./min or greater at least in a temperature range of 800° C. to the highest treatment temperature, more preferably, at least in a temperature range of 700° C. to the highest treatment temperature, and further preferably, at least in a temperature range of 600° C. to the highest treatment temperature. A more preferable rate is 10° C./min or greater, and a further preferable rate is 15° C./min or greater. Moreover, it is preferable that the highest treatment temperature be set to be 900° C. or higher, and it is preferable that the upper limit be set to be 1300° C. or lower when the atmosphere is an oxidizing atmosphere such as a normal atmosphere, and the upper limit be set to be 1600° C. or lower when the atmosphere is an inert atmosphere such as a vacuum, or a nitrogen atmosphere, or the like. In addition, it is preferable that the retention time at the highest treatment temperature be set to be 1 hour or less.

By setting the temperature increasing rate and the temperature decreasing rate to be 6° C./min or greater, residual internal stress produced at synthesizing the cubic boron nitride is instantaneously released, and thus a groove is easily formed on the surface of the abrasive grain. Moreover, when the temperature increasing rate and the temperature decreasing rate are set to be large values, the time during which the abrasive grain is subjected to a high temperature is shortened, and thus a decrease in the strength of the abrasive grain can be prevented. As a result, a cubic boron nitride abrasive grain can be produced, which has a groove on the surface thereof, and in which a decrease in the strength thereof due to heating is prevented. When the highest treatment temperature is set to be 900° C. or lower, a sufficient groove is not formed on the surface of the abrasive grain, and when the highest treatment temperature is set to be higher than 1300° C. in the case of an oxidizing atmosphere and when the highest treatment temperature is set to be higher than 1600° C. in the case of an inert atmosphere, the strength of the abrasive grain is significantly decreased due to heating even though the retention time at the highest temperature is set to be short, which may lead to reduction in a grinding ratio of a resin bonded grinding wheel due to breaking of the abrasive grains thereof.

Heat treatments of abrasive grains are also disclosed in conventional patent documents.

For example, Japanese Examined Patent Application, Second Publication No. S61-6108 discloses a method for reforming c-BN abrasive grains characterized in that the c-BN abrasive grains are subjected to a heat treatment in which temperature is set in a range of 500 to 1300° C. Japanese Examined Patent Application, Second Publication No. S60-58273 discloses a method for reforming c-BN abrasive grains characterized in that the c-BN abrasive grains are subjected to a heat treatment in a molten salt bath in which temperature is set in a range of 500 to 1300° C. It is stated that, according to these methods, internal stress and impurities in the abrasive grains are removed by the heat treatment in which a temperature increasing rate is set to be 5° C./min or less, preferably, in a range of 500 to 900° C. in the case of an oxidizing atmosphere, in a range of 500 to 1300° C. in the case of a reducing or neutral atmosphere, or in a range of 500 to 1300° C. in the case of a molten salt bath, and thus grinding performance of the abrasive grains is improved.

Japanese Unexamined Patent Application, First Publication No. 2000-158347 discloses a manufacturing method for a super abrasive grinding wheel employing heat-treated abrasive grains which have been subjected to a heat treatment at a temperature of 400 to 1200° C. in a vacuum or in a gas atmosphere without oxygen in order to decrease toughness of the abrasive grains. According to this method, because the super abrasive grains are subjected to a heat treatment at a temperature of 400 to 1200° C. in a vacuum or in a gas atmosphere without oxygen, toughness index of the super abrasive grains is decreased and the super abrasive grains can be crushed without reforming thereof, and thus grinding performance can be improved. The document discloses experimental examples in which the abrasive grains are retained in a nitrogen atmosphere for 8 hours at a temperature of 800° C., 900° C., and 1000° C., respectively, and then the abrasive grains are gradually cooled for 6 hours until reaching room temperature.

In contrast to the above conventional methods, the present invention revealed that reduction in strength of the abrasive-grains, which have been subjected to a heat treatment, can be prevented by setting the temperature increasing rate and the temperature decreasing rate to be 6° C./min or greater. As a result, it was revealed that it is possible to perform a heat treatment without having significant reduction in strength of the abrasive grains when the highest treatment temperature is set in a range of 900° C. to 1300° C. in the case of an oxidizing atmosphere, and when the highest treatment temperature is set in a range of 900° C. to 1600° C. in the case of a non-oxidizing atmosphere, and thus a method was invented in which, by instantaneously releasing internal stress of the abrasive grains using a heat treatment, grooves are efficiently formed on the surfaces of the abrasive grains without having significant reduction in strength of the abrasive grains.

FIG. 1 schematically shows the appearance of a cubic boron nitride abrasive grain which has not been subjected to a heat treatment. A cubic boron nitride abrasive grain 10 basically has an octahedral structure including (111) planes 1 serving as primary planes, and most grain crystals are surrounded by flat growth planes. Industrially produced abrasive grains contain, in addition to crystal grains shown in FIG. 1, deformed grains. FIG. 2 schematically shows the appearance of a cubic boron nitride abrasive grain 10 which has grooves formed through a heat treatment. In this case, the grooves 3 are formed on the surfaces of (111) planes 1 constituting the octahedral structure so as to extend from growth planes 2 toward a center portion of each of the planes 1. In practice, the grooves are not necessarily in a simple straight shape; however, retention force between a metallic coating and abrasive grains is improved by the intrusion of the metallic coating into the grooves.

The metallic coating, of the present invention, of the cubic boron nitride abrasive grain in which the metal intrudes into the abrasive grain may be formed on a portion of the surface of the grain; however, it is preferable that the metallic coating cover the entirety of the surface of the grain.

The size of the cubic boron nitride abrasive grain used in the present invention is preferably in a range of 1000 μm to 40 μm, and more preferably, in a range of 500 μm to 40 μm. In the case of grains having a greater average grain size, it is preferable that grooves having a greater depth (d) be formed in order to obtain a sufficient retention force; however, it becomes more difficult for the metal to intrude into the grains when the depth (d) is greater, and, as a result, a sufficient retention force cannot be obtained; therefore, it is preferable that the average grain size be 1000 μm or less. On the other hand, when the average grain size is 40 μm or less, it is difficult to form, on the surface of the abrasive grains, grooves having a size sufficient to improve retention force without having reduction in the strength of the abrasive grains; therefore, it is preferable that the average grain size be 40 μm or greater.

The grit sizes in the present invention are expressed according to the JIS B 4130: 1998 "Diamond/CBN products—Grain sizes of diamond or cubic boron nitride"; however, for carrying out the invention, plural grit size fractions may be mixed, different grit size fractions may be set, or new grit size fractions, which differ from the ones defined in the JIS B 4130, may be established, none of which will cause adverse effects in carrying out the invention. The average grain size of the cubic boron nitride in the present invention is defined as an average value of the mesh sizes of the second and third sieves defined in "mesh sizes of sieves used for various grit sizes" contained in TABLES 2 and 3 in the JIS B 4130.

The grooves in the present invention, which increase retention force between the metallic coating and the abrasive grains, will be more specifically explained below. Assuming a groove having a width of w, a depth of d, and a length of L, when the groove has a portion in which a ratio of the width to the depth (w/d) is less than 1, and a ratio of the width to the length (w/L) of the groove is less than 0.1, the groove preferably increases retention force between the metallic coating and the abrasive grain. It is more preferable that w/d be 0.5 or less, and w/L be 0.05 or less.

When a groove is formed by means of etching employing a chemical solution, the width of the thus-formed groove increases toward the surface of a cBN grain as viewed in the cross section of the groove, since, in general, the etching rate in a depth direction is equal to that in a direction perpendicular to the depth direction. When an attempt is made to form a deep groove by means of etching, etching in a horizontal direction also proceeds, and therefore, the resultant groove becomes a shallow depression as viewed in cross section. Such a groove formed through etching exhibits poor anchoring effect.

When a groove does not have a portion in which the ratio of the width to the depth (w/d) is less than 1, the depth of intrusion of the metallic coating is not sufficient, and thus retention force will not be sufficiently increased. When the ratio of the width to the length (w/L) of a groove is not less than 0.1, because diffusion of metallic ions contained in the plating solution is hindered, deposition of the metal is also hindered, which may lead to insufficient intrusion of the metal and insufficient improvement in the retention force.

A method for measuring the width, depth, and length of a groove will be explained below.

The width of a groove can be determined by observing a cross-section of an abrasive grain, and by measuring the width of the aperture of the groove at the surface of the cubic boron nitride, as shown in FIG. 5. The depth of the groove can be determined by measuring the length of a normal extending from the deepest point of the groove to an extension line of the line corresponding to the width of the groove in the cross-section of the abrasive grain.

The length of the groove can be determined by measuring the entire length of grooves observed on the abrasive grain (on a crystal face). In the case in which the groove has branching portions, the branching portions are also included in the measurement.

More specifically, an abrasive grain is embedded in resin while exposing a crystal face thereof, a photograph of the surface of the abrasive grain is taken, and the length of a groove is measured in the photograph. Moreover, the abrasive grain embedded in resin is polished so that a cross-section thereof is exposed, an SEM photograph of the cross-section is taken, the width and depth of the observed groove are measured in the photograph, and the ratio of the width to the depth (w/d) and the ratio of the width to the length (w/L) are calculated.

The measured specific width (w), depth (d), and length (L) of the groove vary depending on grit size, and it is preferable that the depth be 0.02 to 0.25 times the average grain size, and the length be 0.5 to 10 times the average grain size. These ranges are preferable because sufficient improvement in retention force cannot be obtained when the values are less than the lower limits, and the strength of the abrasive grains is significantly decreased when the values are greater than the upper limits. With regard to the width of the groove, advantageous effects are expected with any values within the above-mentioned range; however, when the width is 0.3 μm or less, it is difficult for the metal to intrude into, and when the width is 3 μm or greater, the strength of the abrasive grains may be decreased; therefore, it is more preferable that the width be in a range of 0.3 to 3 μm.

The cubic boron nitride abrasive grains used in the present invention may be of a monocrystal structure or a polycrystal structure, and the abrasive grains may be subjected to a pre-surface treatment beforehand. Significant advantageous effects can be obtained when abrasive grains having a monocrystal structure are used.

The cubic boron nitride abrasive grains may be formed into agglomerates through heat treatment; however, the agglomerates can be readily broken into grains by washing the agglomerates using hydrochloric acid or the like.

The cubic boron nitride abrasive grains obtained through the above processes are then subjected to a process in which a metallic coating is applied. It is preferable that a treatment for precipitating metal (palladium or the like), which is to be cores of nickel to be deposited, be applied to the surfaces of the abrasive grains before applying a nickel coating to the surfaces of the abrasive grains using an electroless-plating method. For example, a known method is, in general, used in which tin chloride is dispersed and coated on the surfaces of the abrasive grains (a sensitizer process), and then metallic palladium is deposited (an activator process).

In the present invention, it is more preferable that the sensitizer-activator process be repeated two times or more in order for a metallic layer to be readily deposited and intruded into the grooves on the surfaces of the cubic boron nitride abrasive grains. By repeating these processes two times or more, metallic palladium, which is to be cores of nickel to be deposited, is readily precipitated in deep portions of the grooves.

The metallic coating of the metal-coated cubic boron nitride abrasive grains of the present invention may be a known metallic coating of nickel, cobalt, or the like formed by electroplating or electroless-plating (chemical plating). When the metallic coating includes a single layer, it is preferable that the metallic coating be a nickel coating formed by electroplating or electroless-plating. When the metallic coating includes two or more layers, it is-preferable that an outermost layer be a nickel coating formed by electroplating or electroless-plating. This is because the nickel coating formed by electroplating or electroless-plating has a superior corrosion resistance. In addition, when the metallic coating includes two or more layers, it is preferable that an inner layer be a cobalt coating layer formed by electroplating or electroless-plating. Because a cobalt coating layer formed by electroplating or electroless-plating does not easily deform at high temperature, and prevents degradation of the abrasive grains due to grinding heat, the coming-off of the abrasive grains is reduced, and as a result, grinding ratio can be improved.

In the present invention, coatings of a nickel phosphorus compound or coatings of a cobalt phosphorus compound having phosphorus at any ratio, or having elements other than phosphorus as a solid solution are referred to as a nickel coating or a cobalt coating formed by electroplating or electroless-plating (chemical plating), and may be expressed as coating of (Ni/P) or (Co/P).

The case in which a single nickel layer is formed using electroless-plating will be specifically explained. After repeating the above-mentioned sensitizer-activator process two times or more, the abrasive grains are immersed in an electroless-plating bath (e.g., a mixed bath of nickel sulfate, sodium hypophosphite, sodium acetate, sodium citrate, and sulfuric acid), and electroless-plating process is carried out so that nickel is deposited on the surface of the abrasive grains. In this case, the electroless-plating solution is agitated in order to prevent aggregation of the abrasive grains due to presence of the plating metal. Because the status depends on the size and shape of the plating bath, the agitation method, and the like, it is necessary to determine the conditions for each of the apparatuses.

After completion of the metal coating process, the metal-coated cubic boron nitride abrasive grains are taken out from the plating bath, and are washed with water and dried so as to yield the metal-coated cubic boron nitride abrasive grains of the present invention.

The amount of metallic coating of the metal-coated cubic boron nitride abrasive grains of the present invention can be freely determined; however, it is preferable that the amount of the metallic coating to the entire metal-coated cubic boron nitride abrasive grains including the metallic coating be in a range of 20 to 80 wt. %. When the amount is 20 wt. % or less, sufficient retention force between the resin bond and the metallic coating cannot be obtained in some cases, the coming-off of the abrasive grains with the metallic coating is increased, and improvement in the grinding ratio of the resin bond will be reduced. On the other hand, when the amount is 80 wt. % or more, because a large portion of the resin bonded grinding wheel is occupied by the metallic coating, and the number of cubic boron nitride abrasive grains in the resin bonded grinding wheel is decreased, the resin bonded grinding wheel may exhibit insufficient performance as a grinding tool.

FIG. 3 is a perspective view showing a cubic boron nitride abrasive grain having, on its surface, grooves 3, the surface of the grain being coated with a metallic coating layer. FIG. 4 is schematic cross-sectional view of the cubic boron nitride abrasive grain of FIG. 3, as taken along the line A–A'. As shown in FIG. 4, a metallic coating layer 5 formed on the surface of a cubic boron nitride abrasive grain 10 reaches a deep portion of each of the grooves 3 formed on the grain surface; i.e., the layer 5 intrudes into the cubic boron nitride abrasive grain 10. FIG. 5 is a schematic enlarged view showing a region of the abrasive grain into which the metallic coating layer 5 intrudes. As shown in FIG. 5, when the ratio (w/d) of the width (w) to the depth (d) of the grooves 3 is less than 1, by virtue of the anchoring effect of the metallic coating layer 5 which intrudes into the grooves 3, it is considered that the retention force of the cubic boron nitride abrasive grain 10 and the metallic coating layer 5 is improved.

When used in a resin bonded grinding wheel, it is preferable that the amount of the metal-coated cubic boron nitride abrasive grains of the present invention with respect to the entirety of abrasive grains be in a range of 5 wt. % to 100 wt. %, it is more preferable that the amount be in a range of 25 wt. % to 100 wt. %. When the amount of the metal-coated cubic boron nitride abrasive grains of the present invention is 5 wt. % or less, the effects due to use of the metal-coated cubic boron nitride abrasive grains of the present invention will not be apparent, and the grinding ratio will not be much improved.

Because the metal-coated cubic boron nitride abrasive grains of the present invention have the above-mentioned structure, the retention force between the metallic coating and the abrasive grains is greater than that in conventional metal-coated cubic boron nitride abrasive grains (e.g., disclosed in Patent Documents 1 to 4). As a result, the amount of the abrasive grains coming off the metallic coating during grinding operations is reduced, the grinding ration is improved, and the cost of grinding operations can be reduced.

Moreover, because the retention force between the metallic coating and the abrasive grains is appropriate when compared with conventional cubic boron nitride abrasive grains having a metallic coating or the like in which the retention force between the metallic coating and the abrasive grains is increased using other methods (e.g., disclosed in Patent Documents 5 to 8), when grinding force applied to the abrasive grains is increased due to wear of the abrasive grains, the abrasive grains come off, and thus increase in grinding power is prevented. In addition, the manufacturing method and processes are simplified when compared with the methods disclosed in Patent Documents 5 to 8. As a result, the cost for manufacturing metal-coated cubic boron nitride abrasive grains is reduced, and the cost of grinding operations can be reduced.

Furthermore, it was revealed that because the metal-coated cubic boron nitride abrasive grains of the present invention reduce the amount of abrasive grains coming off while preventing an increase in the grinding power of a resin bonded grinding wheel, expansion of the grinding wheel due to grinding heat and loss of shape of the grinding wheel due to the coming-off of the abrasive grains will not easily occur, and thus accuracy of workpieces, in particular, surface accuracy of workpieces, is improved.

For example, a resin bonded grinding wheel in which the metal-coated cubic boron nitride abrasive grains of the present invention are used can be manufactured using a known method. A bonding agent for the resin bonded grinding wheel may be selected from resin bonds on the market according to applications. The bonding agent may be, for example, a phenol based high molecular compound, or a polyimide based high molecular compound. It is preferable that the compositional proportion of the bonding agent in the grinding wheel be in a range of 25 vol. % to 90 vol. %. When the compositional proportion of the bonding agent is less than 25 vol. %, retention force of the abrasive grains is decreased, the amount of abrasive grains coming-off is increased, and the grinding ratio is decreased, which makes the grinding wheel inappropriate as a grinding tool. When the compositional proportion of the bonding agent is more than 90 vol. %, the compositional proportion of the abrasive grains is decreased, which makes the grinding wheel inappropriate as a grinding tool.

The resin bonded grinding wheel of the present invention may also include additives generally used in manufacturing resin bonded grinding wheels such as solid lubricant, supplemental binder, aggregate, or porosity imparting agent.

EXAMPLES

The present invention will be explained below with reference to Examples; however, the present invention is not limited to these Examples.

Example 1

Cubic boron nitride abrasive grains, SBN-B™ (grit size fraction: 100/120 grade), product of Showa Denko K.K., were subjected to a heat treatment in air for one hour under the conditions in which temperature increasing rate and decreasing rate were 15° C./min, temperature range was from room temperature to 1050° C., and time for retaining at the highest temperature was 1 hour. After heat treatment, the abrasive grains were collected, were immersed in diluted hydrochloric acid for 1 hour, were subjected to acid removal, and were dried. Grooves were observed on the surfaces of the abrasive grains after the treatments. An example SEM image is shown in FIG. 6. 50 grains were chosen from the treated abrasive grains at random, and each of the grains was embedded in resin in such a manner that any one of the crystal faces was exposed. The exposed face and a cross-section which was substantially perpendicular to the exposed face, and which was polished using diamond slurry, were observed using an SEM. As a result, it was revealed that all 50 grains included grooves, and the ratio of the grains that included grooves having a portion in which the ratio (w/d) of the width (w) to the depth (d) was less than 1 was 82% (i.e., 41 grains). In addition, the ratio (d/L) of the length (L) of a groove to the depth (d) was less than 0.1 for all 50 grains. The measured results are shown in TABLE 1. In TABLE 1, "length of groove" indicates a measured length of a groove that was included in an exposed face of a grain embedded in resin, and "width of groove" and "depth of groove" indicate measured values of a groove that was included in the face in which the length of the groove was measured. The width and depth in TABLE 1 correspond to width and depth which give a minimum ratio of the width to the depth for each of the grains.

Assuming a toughness index of the abrasive grains before treatment to be 100, the toughness index after heat treatment was decreased to 91.

TABLE 1

| Abrasive grain No. | Width of groove (μm) | Depth of groove (μm) | Length of groove (μm) | Ratio (w/d) of width (w) to depth (d) | Ratio (w/L) of width (w) to length (L) |
|---|---|---|---|---|---|
| 1 | 1.4 | 6.6 | 150 | 0.21 | 0.009 |
| 2 | 0.6 | 9.9 | 165 | 0.06 | 0.004 |
| 3 | 1.9 | 8.9 | 130 | 0.21 | 0.015 |
| 4 | 0.9 | 6.9 | 160 | 0.13 | 0.006 |
| 5 | 0.8 | 9.5 | 195 | 0.08 | 0.004 |
| 6 | 1.9 | 8.7 | 100 | 0.22 | 0.019 |
| 7 | 1.9 | 6.5 | 160 | 0.29 | 0.012 |
| 8 | 1.1 | 5.8 | 180 | 0.19 | 0.006 |
| 9 | 1.3 | 8.7 | 155 | 0.15 | 0.008 |
| 10 | 1.9 | 5.9 | 130 | 0.32 | 0.015 |
| 11 | 0.6 | 5.6 | 100 | 0.11 | 0.006 |
| 12 | 1.3 | 6.6 | 160 | 0.20 | 0.008 |
| 13 | 1.8 | 7.5 | 80 | 0.24 | 0.023 |
| 14 | 1.7 | 7.7 | 70 | 0.22 | 0.024 |
| 15 | 0.8 | 9.7 | 110 | 0.08 | 0.007 |
| 16 | 1.0 | 8.6 | 170 | 0.12 | 0.006 |
| 17 | 1.3 | 3.5 | 190 | 0.37 | 0.007 |
| 18 | 0.9 | 5.3 | 240 | 0.17 | 0.004 |
| 19 | 2.0 | 7.0 | 35 | 0.29 | 0.057 |
| 20 | 1.8 | 3.4 | 160 | 0.53 | 0.011 |
| 21 | 0.8 | 3.5 | 240 | 0.23 | 0.003 |
| 22 | 0.9 | 6.9 | 65 | 0.13 | 0.014 |
| 23 | 1.2 | 5.9 | 295 | 0.20 | 0.004 |
| 24 | 0.8 | 3.5 | 240 | 0.23 | 0.003 |
| 25 | 0.6 | 6.2 | 60 | 0.10 | 0.010 |
| 26 | 0.8 | 3.0 | 30 | 0.27 | 0.027 |
| 27 | 1.1 | 6.3 | 130 | 0.17 | 0.008 |
| 28 | 1.7 | 9.2 | 85 | 0.18 | 0.020 |
| 29 | 1.8 | 7.6 | 190 | 0.24 | 0.009 |
| 30 | 0.9 | 5.0 | 145 | 0.18 | 0.006 |
| 31 | 1.8 | 4.1 | 100 | 0.44 | 0.018 |
| 32 | 1.1 | 9.0 | 140 | 0.12 | 0.008 |
| 33 | 1.0 | 4.0 | 230 | 0.25 | 0.004 |
| 34 | 0.6 | 9.5 | 195 | 0.06 | 0.003 |
| 35 | 1.8 | 5.8 | 155 | 0.31 | 0.012 |
| 36 | 1.5 | 9.9 | 245 | 0.15 | 0.006 |
| 37 | 1.2 | 6.8 | 105 | 0.18 | 0.011 |
| 38 | 1.4 | 6.6 | 300 | 0.21 | 0.005 |
| 39 | 0.6 | 5.9 | 250 | 0.10 | 0.002 |
| 40 | 1.6 | 7.5 | 300 | 0.21 | 0.005 |
| 41 | 1.4 | 5.0 | 290 | 0.28 | 0.005 |
| 42 | 1.7 | 1.5 | 50 | 1.13 | 0.034 |
| 43 | 2.6 | 2.5 | 235 | 1.04 | 0.011 |
| 44 | 2.7 | 2.0 | 175 | 1.35 | 0.015 |
| 45 | 2.5 | 2.3 | 165 | 1.09 | 0.015 |
| 46 | 2.5 | 1.9 | 280 | 1.32 | 0.009 |
| 47 | 2.7 | 2.0 | 295 | 1.35 | 0.009 |
| 48 | 1.8 | 1.3 | 110 | 1.38 | 0.016 |
| 49 | 2.4 | 2.2 | 150 | 1.09 | 0.016 |
| 50 | 2.4 | 1.9 | 155 | 1.26 | 0.015 |

Comparative Example 1

Cubic boron nitride abrasive grains, SBN-B™ (grit size fraction: 100/120 grade), product of Showa Denko K.K., were subjected to a heat treatment in air for one hour under the conditions in which temperature increasing rate and decreasing rate were 5° C./min, temperature range was from room temperature to 1050° C., and time for retaining at the highest temperature was 4 hours. After heat treatment, the abrasive grains were collected, were immersed in diluted hydrochloric acid for 1 hour, were subjected to acid removal, and were dried. Grooves were observed on the surfaces of some of the abrasive grains after the treatments. 50 grains were chosen from the treated abrasive grains at random, and were observed using an SEM in the same manner as for Example 1. As a result, it was revealed that the ratio of the grains that included grooves was 4% (i.e., 2 grains), none of the grains included grooves having a portion in which the ratio (w/d) of the width (w) to the depth (d) was less than 1. In addition, the ratio (d/L) of the length (L) of a groove to the depth (d) was less than 0.1 for all grooves observed. The measured results are shown in TABLE 2.

Assuming a toughness index of the abrasive grains before heat treatment to be 100, the toughness index after heat treatment was decreased to 76.

TABLE 2

| Abrasive grain No. | Width of groove (μm) | Depth of groove (μm) | Length of groove (μm) | Ratio (w/d) of width (w) to depth (d) | Ratio (w/L) of width (w) to length (L) |
|---|---|---|---|---|---|
| 1 | 1.4 | 1.0 | 150 | 1.40 | 0.009 |
| 2 | 1.8 | 1.3 | 165 | 1.38 | 0.011 |
| 3 to 50 | Grooves were not observed | | | | |

Comparative Example 2

Cubic boron nitride abrasive grains, SBN-B™ (grit size fraction: 100/120 grade), product of Showa Denko K.K., were subjected to a heat treatment in air under the same conditions as for Comparative Example 1 except that temperature increasing rate and decreasing rate were set to be 1° C./min. After heat treatment, the abrasive grains were collected, were immersed in diluted hydrochloric acid for 1 hour, were subjected to acid removal, and were dried. Grooves were observed on the surfaces of some of the abrasive grains after the treatments. 50 grains were chosen from the treated abrasive grains at random, and were observed using an SEM in the same manner as for Example 1. As a result, it was revealed that none of the grains had grooves.

Assuming a toughness index of the abrasive grains before heat treatment to be 100, the toughness index after heat treatment was decreased to 70.

Examples 2 to 12, Comparative Examples 3 to 35

The abrasive grains shown in TABLE 3 were coated with metallic coatings, respectively, at composition ratios also shown in TABLE 3. In TABLE 3, the symbol Ni indicates an electroplated nickel coating, the symbol Ni/P indicates an electroless-plated nickel coating, the symbol Co indicates an electroplated cobalt coating, the symbol Co/P indicates an electroless-plated cobalt coating, and the symbol Ti indicates a titanium coating. The numbers in parentheses following the symbols of metallic coatings indicate the volume ratio of each of the metallic coatings when assuming that the entire volume of the cubic boron nitride abrasive grains including the metallic coatings to be 100%. The metal-coated cubic boron nitride abrasive grains of Examples 2 to 12 were embedded in resin, were polished using diamond slurry, and observed using an SEM. As a representative example in which metallic coating intrudes into a groove formed on the surface of the cubic boron nitride abrasive grain, an SEM image of Example 2 is shown in FIG. 7.

Resin bonded grinding wheels were formed using metal-coated cubic boron nitride abrasive grains of Examples 2 to 12 and of Comparative Examples 3 to 35. The compositional proportions of the grinding wheels, the shape of the grinding wheels, and the like are as follows.

| Compositional proportions of the grinding wheels (vol. %) | |
|---|---|
| Abrasive grains | 31.4 |
| Resin bond | 58.6 |
| Filler (Fused alumina #600) | 10.0 |

Shape of grinding wheels: 6A2 Type $100^D \times 35^T \times 2^X \times 3^W \times 15^E \times 38.1^H$
Grit size fraction: 100/120
Concentration: 75

Grinding tests were performed using the fabricated resin bonded grinding wheels under the conditions as follows.
Grinding machine: Auto tool grinding machine made by Makino Milling Machine Co., Ltd.; Model CF1A-40™; and Grinding axis motor: 1.5 kW
Workpiece: SKH-51 (HRC=62 to 64)
Surface of workpiece: 5 mm×40 mm
Type of grinding: Dry and traverse grinding
Grinding conditions:
wheel speed: 1180 m/min
Table speed: 3 m/min
Infeed: 70 μm The symbols defining the shape of the grinding wheel are expressed in accordance with JIS B 4131: 1998 "Diamond/CBN products—Diamond or CBN grinding wheels", the reference symbol for the workpiece is expressed in accordance with JIS G 4403: 2000 "High speed tool steel".

The results of the grinding tests using the fabricated resin bonded grinding wheels are shown in TABLE 3.

TABLE 3

| Grinding wheel | Abrasive Grains | Composition of metallic coatings | Grinding ratio | Grinding power (W) | Surface roughness Ra of Workpiece (μm) |
|---|---|---|---|---|---|
| Ex. 2 | Ex. 1 | Ni/P(38) | 120 | 460 | 0.83 |
| Ex. 3 | Ex. 1 | Co/P(38) | 137 | 490 | 0.66 |
| Ex. 4 | Ex. 1 | Ni/P(8), Ni(30) | 121 | 480 | 0.92 |
| Ex. 5 | Ex. 1 | Co/P(8), Ni(30) | 126 | 460 | 1.02 |
| Ex. 6 | Ex. 1 | Co/P(8), Ni/P(30) | 123 | 480 | 0.63 |
| Ex. 7 | Ex. 1 | Ni/P(3), Co/P(15), Ni/P(20) | 131 | 490 | 0.81 |
| Ex. 8 | Ex. 1 | Ni/P(3), Co(33), Ni/P(2) | 140 | 450 | 0.67 |
| Ex. 9 | Ex. 1 | Co/P(3), Ni/P(33), Ni/P(2) | 134 | 460 | 0.74 |
| Ex. 10 | Ex. 1 | Co/P(3), Ni(15), Co/P(20) | 133 | 460 | 0.66 |
| Ex. 11 | Ex. 1(50%) Non-treated (50%) | Ni/P(38) | 109 | 480 | 1.21 |
| Ex. 12 | Ex. 1(10%) Non-treated(90%) | Ni/P(38) | 102 | 470 | 1.39 |
| Comp. Ex. 3 | Non-treated | Ti(3), Ni/P(35) | 108 | 670 | 1.6 |
| Comp. Ex. 4 | Non-treated | Ti(3), Co/P(15), Ni/P(20) | 107 | 630 | 1.7 |
| Comp. Ex. 5 | Non-treated | Ti(3), Co(33), Ni/P(2) | 111 | 670 | 1.68 |
| Comp. Ex. 6 | Non-treated | Ti(3), Ni(33), Ni/P(2) | 98 | 690 | 1.72 |
| Comp. Ex. 7 | Non-treated | Ti(3), Ni(15), Co/P(20) | 104 | 680 | 1.42 |
| Comp. Ex. 8 | Non-treated | Ni/P(38) | 86 | 530 | 1.67 |
| Comp. Ex. 9 | Non-treated | Co/P(38) | 75 | 550 | 1.55 |
| Comp. Ex. 10 | Non-treated | Ni/P(8), Ni(30) | 70 | 540 | 1.61 |
| Comp. Ex. 11 | Non-treated | Co/P(8), Ni(30) | 76 | 540 | 1.72 |
| Comp. Ex. 12 | Non-treated | Co/P(8), Ni/P(30) | 85 | 520 | 1.77 |
| Comp. Ex. 13 | Non-treated | Ni/P(3), Co/P(15), Ni/P(20) | 70 | 540 | 1.45 |
| Comp. Ex. 14 | Non-treated | Ni/P(3), Co(15), Ni/P(20) | 69 | 540 | 1.69 |
| Comp. Ex. 15 | Non-treated | Co/P(3), Ni/P(15), Ni/P(20) | 63 | 530 | 1.68 |
| Comp. Ex. 16 | Non-treated | Co/P(3), Ni(15), Co/P(20) | 75 | 530 | 1.48 |

TABLE 3-continued

| Grinding wheel | Abrasive Grains | Composition of metallic coatings | Grinding ratio | Grinding power (W) | Surface roughness Ra of Workpiece (μm) |
|---|---|---|---|---|---|
| Comp. Ex. 17 | Comp. Ex. 1 | Ni/P(38) | 81 | 540 | 1.69 |
| Comp. Ex. 18 | Comp. Ex. 1 | Co/P(38) | 67 | 540 | 1.77 |
| Comp. Ex. 19 | Comp. Ex. 1 | Ni/P(8), Ni(30) | 78 | 560 | 1.66 |
| Comp. Ex. 20 | Comp. Ex. 1 | Co/P(8), Ni(30) | 63 | 510 | 1.51 |
| Comp. Ex. 21 | Comp. Ex. 1 | Co/P(8), Ni/P(30) | 67 | 520 | 1.48 |
| Comp. Ex. 22 | Comp. Ex. 1 | Ni/P(3), Co/P(33), Ni/P(2) | 89 | 530 | 1.56 |
| Comp. Ex. 23 | Comp. Ex. 1 | Ni/P(3), Co(33), Ni/P(2) | 71 | 540 | 1.41 |
| Comp. Ex. 24 | Comp. Ex. 1 | Co/P(3), Ni/P(33), Ni/P(2) | 82 | 540 | 1.67 |
| Comp. Ex. 25 | Comp. Ex. 1 | Co/P(3), Ni(33), Co/P(2) | 69 | 510 | 1.72 |
| Comp. Ex. 26 | Comp. Ex. 2 | Ni/P(38) | 64 | 520 | 1.58 |
| Comp. Ex. 27 | Comp. Ex. 2 | Co/P(38) | 75 | 500 | 1.62 |
| Comp. Ex. 28 | Comp. Ex. 2 | Ni/P(8), Ni(30) | 89 | 530 | 1.60 |
| Comp. Ex. 29 | Comp. Ex. 2 | Co/P(8), Ni(30) | 87 | 530 | 1.65 |
| Comp. Ex. 30 | Comp. Ex. 2 | Co/P(8), Ni/P(30) | 87 | 520 | 1.45 |
| Comp. Ex. 31 | Comp. Ex. 2 | Ni/P(3), Co/P(15), Ni/P(20) | 89 | 560 | 1.41 |
| Comp. Ex. 32 | Comp. Ex. 2 | Ni/P(3), Co(33), Ni/P(2) | 82 | 530 | 1.51 |
| Comp. Ex. 33 | Comp. Ex. 2 | Co/P(3), Ni/P(33), Ni/P(2) | 76 | 510 | 1.79 |
| Comp. Ex. 34 | Comp. Ex. 2 | Co/P(3), Ni(15), Co/P(20) | 71 | 510 | 1.61 |
| Comp. Ex. 35 | Ex. 1 (3%) Non-treated (97%) | Ni/P(38) | 84 | 520 | 1.63 |

Each of the grinding ratios indicated in the TABLE is obtained by dividing the removed volume of the workpiece during grinding by the removed volume of the grinding wheel, and greater grinding ratios mean better grinding performance. The grinding power indicates power of a motor for rotating the grinding wheel during grinding, and less grinding power means less grinding resistance and better grinding performance. The surface roughness expressed in Ra (μm) indicates the surface roughness of the workpiece after grinding, and less surface roughness means better surface accuracy after grinding.

The metal-coated cubic boron nitride abrasive grain of the present invention is obtained by forming grooves, in which the ratio (w/d) of the width (w) to the depth (d) is less than 1, and the ratio (w/L) of the width (w) to the length (L) is less than 0.1, on the surface of a cubic boron nitride abrasive grain using a heat treatment or the like, and by applying metallic coating thereon. Because the retention force (bonding strength) between the metallic coating and the abrasive grain is appropriately large, the amount of the abrasive grains coming off during grinding operation is appropriately reduced, and thus a resin bonded grinding wheel can be fabricated in which a high grinding ratio is achieved, and an increase in grinding power is prevented. In addition, because an increase in grinding power is prevented, grinding heat is maintained to be less, and because a high grinding ratio is achieved, loss of shape of the grinding wheel is prevented, and thus grinding accuracy can be improved, and surface accuracy of the workpiece can also be improved.

Furthermore, because the manufacturing processes are simplified when compared with the case in which metal-coated cubic boron nitride abrasive grain is manufactured using a conventional method while intending to improve grinding ratio, the cost for manufacturing abrasive grains can be reduced.

As a result of these facts, the cost for grinding operations can be reduced when compared with the cases in which conventional cubic boron nitride abrasive grains are used.

What is claimed is:

1. A metal-coated cubic boron nitride abrasive grain comprising a cubic boron nitride abrasive grain, wherein the cubic boron nitride abrasive grain has a groove formed on the surface thereof, wherein the groove formed on the surface of the cubic boron nitride abrasive grain has a portion in which the ratio (w/d) of the width (w) of the portion to the depth (d) thereof is less than 1, and a metal intruding into the groove of the cubic boron nitride abrasive grain.

2. A metal-coated cubic boron nitride abrasive grain according to claim 1, wherein the cubic boron nitride abrasive grain is coated with a metallic layer comprised of the metal that intrudes into the cubic boron nitride abrasive grain.

3. A metal-coated cubic boron nitride abrasive grain according to claim 1, wherein the width (w) of the groove formed on the surface of the cubic boron nitride abrasive grain is in a range of 0.3 to 3 μm, and the depth (d) thereof is in a range of greater than 0.3 to 250 μm.

4. A metal-coated cubic boron nitride abrasive grain according to claim 1, wherein the groove formed on the surface of the cubic boron nitride abrasive grain has a portion in which the ratio (w/L) of the width (w) of the portion to the length (L) thereof is 0.1 or less.

5. A metal-coated cubic boron nitride abrasive grain according to claim 1, wherein the groove, which is formed on the surface of the cubic boron nitride abrasive grain and has a portion in which the ratio (w/d) is less than 1, has a length (L) of 20 μm or greater.

6. Metal-coated cubic boron nitride abrasive grains according to claim 1, wherein an average diameter of the cubic boron nitride abrasive grains is in a range of 40 to 1000 μm.

7. A metal-coated cubic boron nitride abrasive grain according to claim 1, wherein the metallic coating includes at least one layer selected from a group consisting of an electroplated nickel coating, an electroplated cobalt coating, an electroless-plated nickel coating, and an electroless-plated cobalt coating.

8. A metal-coated cubic boron nitride abrasive grain according to claim 1, wherein the metallic coating includes at least one layer of an electroplated nickel coating or an electroless-plated nickel coating.

9. A metal-coated cubic boron nitride abrasive grain according to claim 1, wherein an outermost layer of the metallic coating is an electroplated nickel coating or an electroless-plated nickel coating.

10. A metal-coated cubic boron nitride abrasive grain according to claim 1, wherein the metallic coating is an electroplated nickel coating or an electroless-plated nickel coating.

11. A metal-coated cubic boron nitride abrasive grain according to claim 1, wherein the metallic coating has a double-layer structure comprising a first layer of an electroless-plated nickel coating or an electroless-plated cobalt coating, a second layer of an electro-plated nickel coating or an electroless-plated nickel coating which has a composition different from that of the first layer.

12. A metal-coated cubic boron nitride abrasive grain according to claim 1, wherein the metallic coating has a triple-layer structure comprising a first layer of an electroless-plated nickel coating or an electroless-plated cobalt coating, a second layer of an electroplated nickel coating, an electroless-plated nickel coating, an electroplated cobalt coating, or an electroless-plated cobalt coating which has a composition different from that of the first layer, and a third layer of an electro-plated nickel coating or an electroless-plated nickel coating which has a composition different from that of the second layer.

13. A metal-coated cubic boron nitride abrasive grain according to claim 1, wherein the amount of the metallic coating is from 20 to 80 wt. % based on the entire metal-coated cubic boron nitride abrasive grain including the metallic coating.

14. Abrasive grains comprising the metal-coated cubic boron nitride abrasive grains according to claim 1 in an amount of 5 to 100 wt. %.

15. A resin bonded grinding wheel comprising the metal-coated cubic boron nitride abrasive grain according to claim 1.

16. A resin bonded grinding wheel comprising the abrasive grain according to claim 14.

* * * * *